Patented July 31, 1934

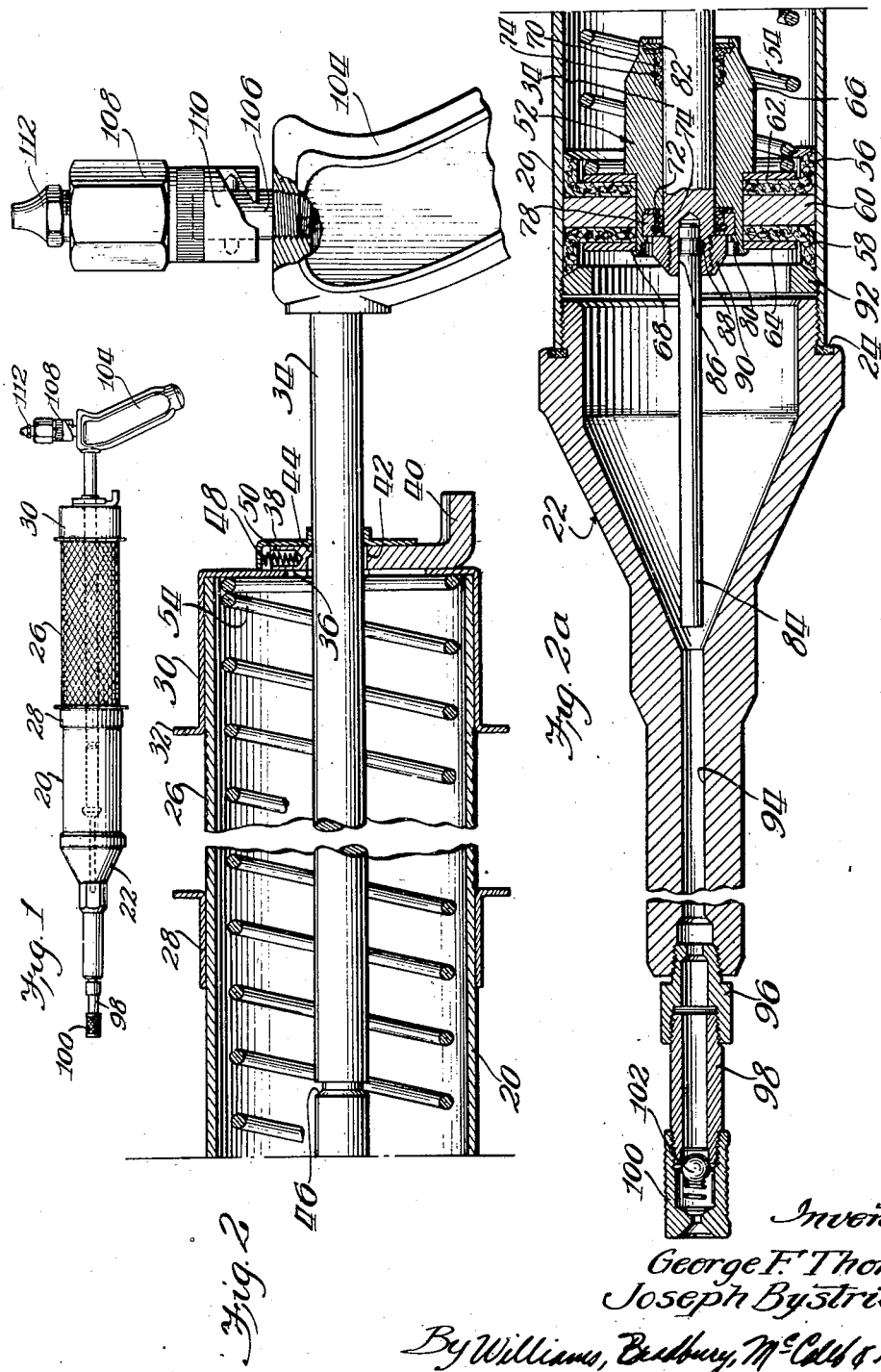

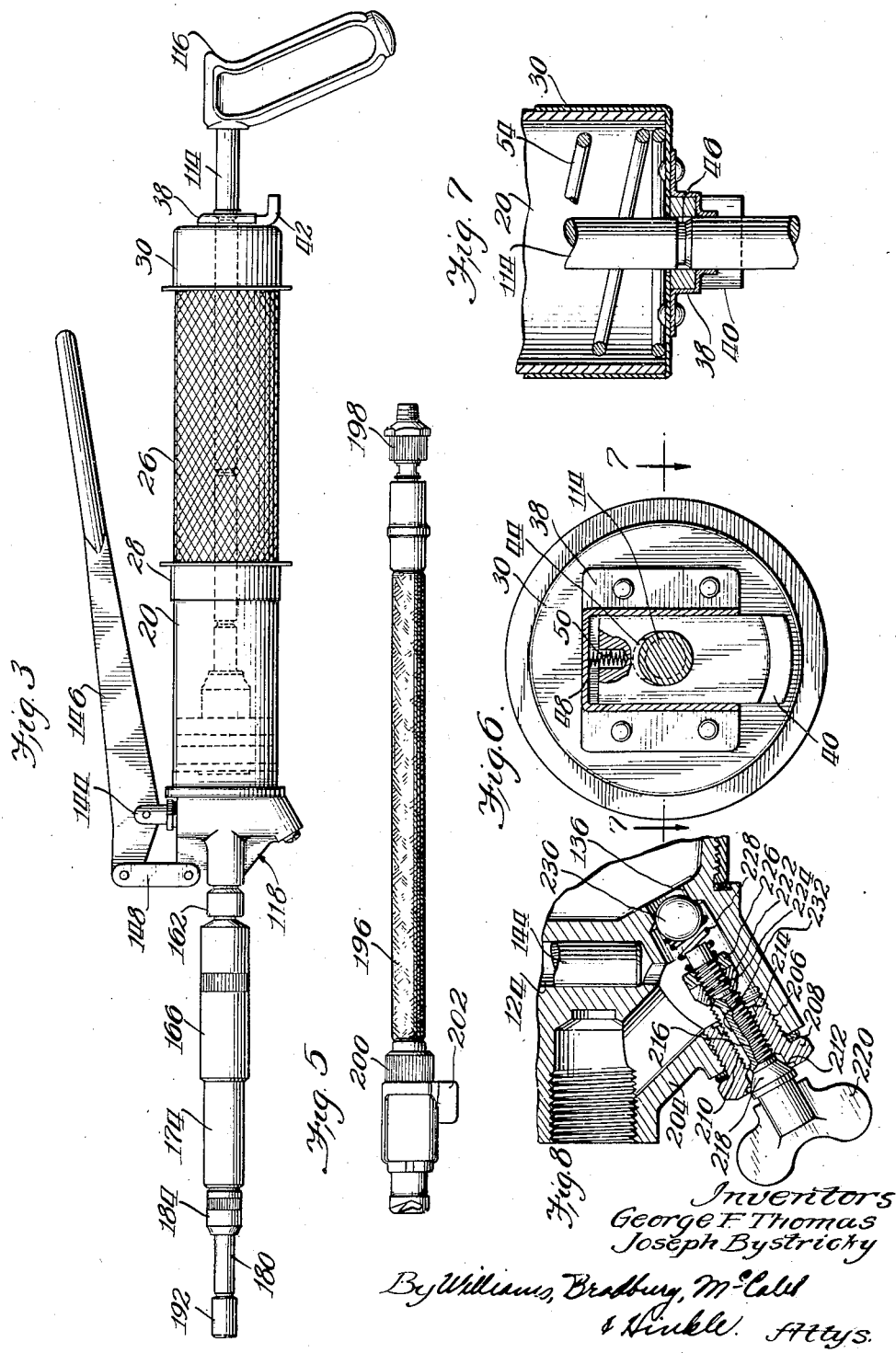

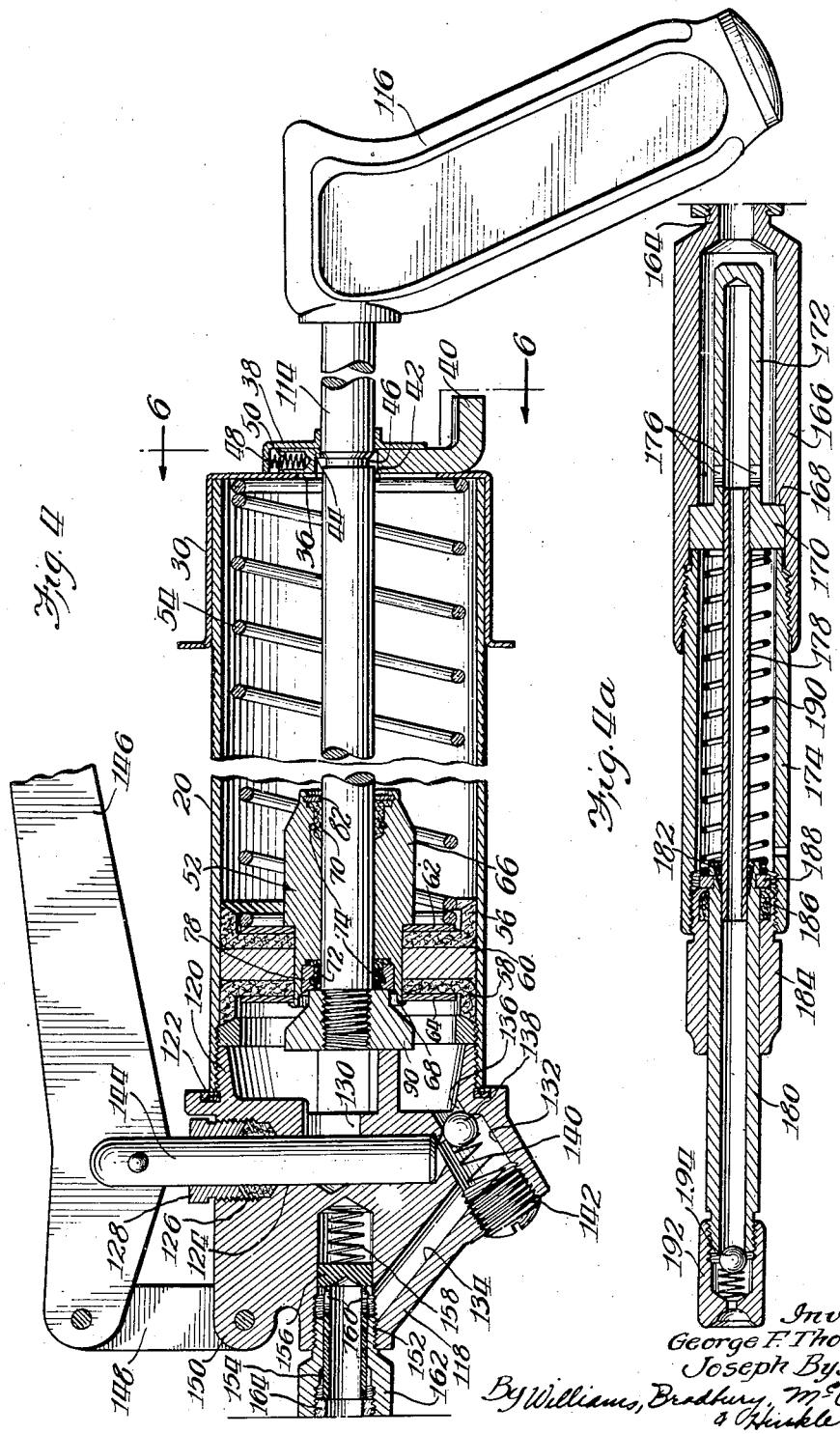

1,968,231

UNITED STATES PATENT OFFICE 1,968,231

LUBRICATING APPARATUS

George F. Thomas, Riverside, and Joseph Bystricky, Chicago, Ill., assignors to Alemite Corporation, Chicago, Ill., a corporation of Delaware Application June 27, 1932, Serial No. 619,404

9 Claims. (Cl. 221—47.3)

Our invention relates generally to lubricating apparatus and more particularly to improvements in lubricant compressors, commonly termed grease guns.

It is an object of our invention to provide an improved form of grease gun for injecting lubricant into bearings requiring lubrication under high pressure.

A further object is to provide an improved grease gun which may be easily filled, may be easily operated, and may be economically manufactured.

A further object is to provide an improved grease gun of the lever operated type, which may be used for the lubrication of bearings equipped with pin fittings or with so-called push type fittings.

A further object is to provide an improved push type grease gun with improved means for priming the high pressure cylinder.

A further object is to provide an improved grease gun having means for readily venting the lubricant chamber and for conditioning the grease gun for operation with pin fittings.

Other objects will appear from the following description, reference being had to the accompanying drawings, in which Figure 1 is an elevation of an improved form of push type grease gun;

Figures 2 and 2—a together constitute a longitudinal sectional view of the grease gun shown in Figure 1;

Figure 3 is an elevation of a modified form of compressor;

Figures 4 and 4—a together constitute a central vertical sectional view of the grease gun shown in Figure 5;

Figure 5 shows a hose and coupler usable with the grease gun shown in Figs. 4 and 4—a;

Figure 6 is a sectional view taken on the line 6—6 of Figure 5;

Figure 7 is a fragmentary sectional view taken on the line 7—7 of Figure 6, and

Figure 8 is a modified form of air vent and valve construction which may be incorporated in the grease gun shown in Figures 3, 4 and 4—a.

Referring to Figs. 1 to 2—a, the grease gun of our invention comprises a barrel 20 having a head 22 threaded thereto, a gasket 24 being embedded in a suitable annular recess formed in the head 22 to seal the connection. The barrel has a grip portion 26 which may be suitably striated or knurled and is provided with a flanged ring 28, which is tightly pressed over the barrel so as to be rigid therewith. A cap 30 is pressed over the end of the barrel and has an outwardly projecting flange 32 positioned at the end of the grip portion 26.

A plunger rod 34 projects through a suitable opening 36 in the cap 30 and is guided by a small flanged housing 38, which may be riveted or spot welded to the cap 30. A latch member 40 is guided for sliding movement transverse to the axis of the barrel 20 and has an opening 42 formed therein through which the plunger rod 34 projects. The latch member is provided with a lug 44 which projects into the opening 42 and is adapted to be forced into an annular groove 46 formed in the piston rod by means of a compression coil spring 48, which is positioned in a recess 50 formed in the latch member 40 and abuts against the wall of the casing 38.

A piston, designated generally as 52, is mounted for free sliding movement upon the plunger rod 34, being normally moved toward the left to exert pressure upon the lubricant in the barrel by means of a compression coil spring 54. The piston 52 comprises a pair of oppositely directed cup leathers 56, 58, which are held in shape by a backing plate 60 and a pair of face plates 62, 64. These plates and the cup leathers are held in assembled relation upon a piston guide 66 by a flange 68, which is spun or peened over the face plate 64. The guide 66 has suitable recesses formed in its ends to receive hat washers 70 and 72, respectively. The flanges of these washers are held in close contact with the cylindrical surface of the plunger rod 34 by C-shaped spring washers 74 which rest in annular grooves of semi-circular cross-section formed in the guide sleeves 66 and in a packing ring 78, respectively. The packing ring 78 is secured to the piston guide 66 by a plurality of lugs 80 which are struck inwardly from the piston guide 66. The hat washer 70 is secured in place by a plate 82, held in place on the guide 66 by having the end of the latter crimped over the edges of the plate.

A plunger 84 fits into a suitable recess 86 formed in the extremity of the plunger rod 34, being secured therein by a transverse hardened steel ball 88 which fits in an annular groove formed in the plunger 84. The ball 88 is held in place by a nut 90 threaded over the end of the plunger rod 34. The nut is of sufficient size to engage the packing ring 78. An annular ring 92 is threaded in the end of the barrel 20 and serves as a limit stop for the piston 52, the ring having its inner face beveled for engagement with the beveled edge of the flange of cup leather 58. The head 22 has a high pressure cylinder 94 formed therein to receive the plunger 84. The extremity of the head is threaded to receive a nipple 96, to which a pipe extension 98 is threaded. A push type nozzle 100, which preferably has its outer surface knurled, is threaded to the end of the pipe extension 98 and has a spring-pressed check valve 102 associated therewith for normally closing the end of the pipe extension.

The plunger rod 34 has a pistol grip handle 104 secured thereto. A dummy pin fitting 106 is threaded in the handle 104 and serves as a means for supporting an adapter 108. This adapter comprises a coupling portion 110, which may be of any suitable construction for making a sealed connection with a pin fitting such, for example, as that shown in the patent to Arthur V. Gullborg, No. 1,307,734. A push type fitting 112 is threaded to the body of the adapter. This push type fitting may be of any suitable construction such, for example, as that shown in the patent to Oscar U. Zerk, No. 1,475,980.

The grease gun shown in Figs. 1 to 2—a is operated in the following manner: To fill the grease gun, the head 22 is unscrewed and the open end of the barrel 20 plunged into a body of grease, and the piston 52 drawn inwardly by means of the plunger rod 34. The partial vacuum created by the withdrawal of the piston 52 causes the grease to be bodily sucked into the barrel. When the plunger rod 34 has been withdrawn to the position where its annular groove 46 reaches the latch member 40, the lug 44 thereof will be forced into the groove by the spring 36, thus locking the plunger rod (and hence the piston 52) in retracted position, with the spring 36 fully compressed. The barrel may then be removed from the body of grease from which it is being filled and the head 22 again attached to the barrel. Thereafter, the latch member 40 may be pushed inwardly (upwardly, Fig. 3), whereupon the spring 36 will force the piston and plunger rod inwardly a short distance slightly to compress the grease within the barrel. As is well known, grease usually contains a small proportion of air, which renders the grease slightly compressible. This pressure exerted upon the lubricant by the spring-pressed piston 52 forces lubricant into the high pressure cylinder 94 to prime the latter.

The grease gun is now in condition for operation to apply lubricant to parts requiring lubrication. The grease gun is carried preferably with one hand grasping the knurled portion of the barrel 20 and the other hand grasping the handle 104. Since there is great likelihood of grease becoming smeared over the handle portion of the barrel, even though endeavors are made to keep the grease gun clean, the flanged ring 28 and the flange on the cap 30 make it possible to obtain a secure grip upon the barrel, in spite of the fact that it may be covered with grease.

The bearings are successively lubricated by applying the nozzle 100 to the ends of push type fittings. Upon initial movement of the handle in the direction of application of the gun to a fitting, the plunger 84 enters the high pressure cylinder 94, cutting off communication between this cylinder and the lubricant in the barrel. Subsequent movement will cause the plunger 84 to move forwardly in the cylinder 94 and force the contents thereof past the check valve 102 into the bearing to be lubricated. At the end of the return stroke, the spring-pressed piston 52 will, of course, again prime the high pressure cylinder.

If bearings equipped with pin fittings are encountered, they may readily be lubricated by first applying thereto the adapter 108, which is carried on the handle 104 for convenience. The nozzle 100 may then be pressed against the push type fitting 112 forming part of the adapter, and thus the grease may readily be forced into the bearings.

The modified form of our invention shown in Figs. 3 to 7, inclusive, comprises a barrel and piston construction generally similar to that previously described, and similar reference characters have therefore been applied to similar parts. The plunger rod 114 is, however, not provided with a socket for the reception of the plunger, and the handle 116 is not provided with the dummy pin fitting, since these parts are not necessary in this type of gun.

The head 118 is provided with a threaded annular flange 120 adapted to be screwed into the barrel 20, and has a recess to receive an annular packing 122. The head 118 has a transverse bore 124, the upper end of which (Fig. 6) is of enlarged diameter to receive a packing 126, and threaded for the reception of a packing gland 128. The cylindrical bore 126 communicates with the grease supply in the barrel 120 through an inlet port 130. The lower end of the cylinder connects with a bore 132 which, in turn, is in communication with a passageway 134 formed in the body 118. A plunger by-pass port 136 is provided to permit direct discharge of the grease from the barrel 120 to the bore 132. This port is normally closed by a check valve 138 pressed against its seat by a coil spring 140, which seats against a plug 142 formed in the end of the bore 132. A plunger 144 is freely reciprocable within the cylindrical bore 124 and has its end secured to a lever handle 146. The extremity of the lever 146 is connected to a pair of links 148 which, in turn, are pivoted to a lug 150 projecting from the head 118.

The passageway 134 communicates with a bore 152 threaded for approximately half its length. A cylindrical slide valve 154 has a cylindrical guide portion 156 which slides in the smooth portion of the bore 152 and is normally pressed outwardly by a compresion spring 158. The valve 154 has a pair of ports 160 through which lubricant may normally flow from the pasageway 118 to the discharge nozzle of the gun. A bushing 162 is tightly screwed into the threaded portion of the bore 152 and serves as a retainer for the sleeve valve 154. When a discharge nozzle, such as that shown in Fig. 4—a, is attached to the head, the small diameter threaded extension 164 of the latter engages the end of the sleeve valve 154 and forces the latter to the right (Fig. 4), so that the lubricant may flow to the discharge nozzle through the ports 160.

When the discharge nozzle is disconnected, the spring 158 will be effective to move the sleeve valve to the left (Fig. 4), to the position where its head 156 will cover the end of the bushing 162.

The discharge nozzle comprises a body portion 166 formed integrally with its threaded extension 164. This body 166 is axially bored and has a shoulder 168 intermediate its ends, against which the head 170 of a cylinder 172 is pressed by a tubular extension 174, which is threaded in the end of the body 166. The cylinder 172 is provided with a pair of inlet ports 176 and is bored so as to have a smooth sliding fit with a tubular plunger 178. The tubular plunger is soldered or otherwise suitably secured to a nozzle tube 180, as indicated at 182. The nozzle sleeve is guided for reciprocation in a sleeve 184, which is threaded in the end of the tubular extension 174. An annular packing 186 is held in an annular recess formed in the sleeve 184 to prevent leakage of lubricant. The nozzle tube 180 has a split spring washer 188 secured adjacent its inner extremity, the washer fitting in an annular groove formed in the tube. The washer thus serves as a means to limit outward movement of the nozzle tube 180 and the tubular plunger 178. The latter elements are normally moved to the left (Fig. 4—a) by a compression coil spring 190, the ends of which abut against the head 170 of the cylinder 172 and the washer 188, respectively. A contact type nozzle 192 is threaded to the end of the nozzle tube 180 and has associated therewith a spring-pressed ball check valve 194, which normally closes the end of the passageway in the tube 180.

The operation of the grease gun shown in Figs. 5 to 8, inclusive, is as follows:

The grease gun may be filled in the manner as previously described with reference to the grease gun in Figs. 1, 2 and 2—a, and the nozzle 192 applied to the push type fitting and pressed thereagainst by means of the handle 116. The force thus applied will cause the nozzle sleeve 180 and its hollow plunger 178 to telescope inwardly. During the first portion of this telescoping movement, the ports 176 will be covered and the lubricant contained within the cylinder 172 forced outwardly past the check valve 194 to the bearing to be lubricated. Upon retraction of the grease gun, the spring 190 will force the nozzle sleeve 180 and its hollow plunger 178 outwardly relative to the tubular extension 174, and as soon as the ports 176 are uncovered the spring 54 will force the large piston inwardly, thereby causing rapid flow of lubricant into the cylinder 172 to prime the latter for the next operation.

When it is desired to use the grease gun shown in Figs. 4 and 4—a for the lubrication of bearings equipped with pin fittings, the flexible conduit and coupling shown in Fig. 5 is attached to the grease gun in place of the push type nozzle assembly illustrated in Fig. 4—a. The flexible hose and coupling assembly comprises a hose 196, which preferably has a tubular flexible metallic core covered with a fabric and rubber composition, and preferably enclosed in a braided wire sheathing. A nipple 198 is secured to one end of the hose and a coupling 200 secured to the other end. The coupling 200 may be of any suitable construction, for example, such as that shown in Gullborg Patent No. 1,307,734, and is preferably joined to the hose 196 by means of a swivel, and has a handle 202 clamped thereto.

When the hose and coupling assembly is screwed into the bushing 162, in place of the nozzle body portion 166, the nipple 198 engages the end of the sleeve valve 154 and moves the latter to its open position. When the grease gun is thus fitted for connection to a pin fitting, the lubricant may be discharged by reciprocation of the lever 146 in the customary manner.

It will be understood that the lever 146 and plunger 144 are operated to eject lubricant only when the hose and coupling assembly is attached to the gun, and that when the gun is being used for the lubrication of bearings equipped with push type fittings the lubricant is forced from the barrel by means of the piston 52, past the check valve 138, directly to the high pressure cylinder 172 forming part of the push type nozzle assembly.

Especially when using the grease gun for the lubrication of bearings equipped with pin fittings, it is frequently desirable to vent the high pressure cylinder 124 to relieve the latter of air which may be pocketed in the cylinder and adjacent passageways. In Fig. 8, we have shown a suitable air bleed valve which may readily be incorporated in the grease gun shown in Figs. 3, 4 and 4—a. Referring to Fig. 8, the head 204 is provided with a threaded opening 206, into which a bushing 208 is screwed. The bushing has a central threaded bore 210 and has valve seats 212 and 214 formed adjacent the ends of the threaded bore. A stem 216 is threaded in the bore 210 and has a valve 218, cooperable with the valve seat 212 formed integrally therewith. A wing handle 220 may also be formed integrally with or may be secured to the stem 216. A valve 222 is screwed on the reduced diameter threaded end portion 224 of the stem 216 and is adapted for engagement with the valve seat 214. A lock nut 226, likewise threaded on the reduced diameter portion 224, securely holds the valve 222 in position. A spring 228 seats upon the lock washer 226 and engages a ball check valve 230, which is adapted to close the port 136.

When the grease gun, equipped with the vent valve mechanism of Fig. 8, is being utilized for the lubrication of bearings equipped with pin fittings, the vent valve mechanism is normally retained in the position as shown in Fig. 8. When, however, an air pocket is found to be present in the cylinder 124 and its adjacent passageways, the stem 216 may be screwed outwardly for a turn or two, thus permitting the entrapped air to escape through a longitudinal groove 232 which extends the full length of the threaded portion of the stem. When the air has escaped, the stem will be returned to its normal position and the valve 218 will prevent the escape of lubricant.

When the grease gun equipped with the vent valve mechanism of Fig. 8 is to be used for the lubrication of bearings equipped with push type fittings, the stem 216 is screwed outwardly sufficiently firmly to clamp the valve 224 against its seat 214. This operation will at the same time relieve the spring pressure from the ball check valve 230, so that lubricant may flow more readily from the barrel to the push type nozzle assembly.

While we have shown and described particular embodiments of our invention, it will be apparent to those skilled in the art that various modifications in design and construction may be made without departing from the spirit of our invention.

What we claim as new and desire to secure by Letters Patent of the United States is:

1. In a portable manually operated high pressure grease gun, the combination of high pressure lubricant ejecting means, a barrel for supplying lubricant to said lubricant ejecting means, a piston rod reciprocable in said barrel, a follower piston slidable on said rod, said piston lower piston slidable on said rod, said piston comprising a guide sleeve having recesses formed in the ends thereof, and a spring and lubricant pressed sealing washer in each of said recesses arranged to effect a lubricant-tight seal between said piston and said rod.

2. In a portable hand operated high pressure grease gun, the combination of a barrel, manually operable means for discharging lubricant therefrom, a ring having an outwardly extending flange secured to said barrel intermediate the ends thereof, and a cupped cap secured over the end of said barrel and having a flange extending outwardly therefrom.

3. In a portable manually operated high pressure grease gun, the combination of a lubricant container, manually operated high pressure ejecting means connected to said container to be supplied with lubricant therefrom, said ejecting means having a discharge outlet and a passageway connecting said outlet with said container, a check valve normally closing said passageway, a vent outlet, a valve stem threaded in said vent outlet, said stem having a pair of valves secured thereto for operation thereby to selectively control said vent outlet, and a spring for holding said check valve closed, said spring being arranged to have its tension varied by movement of said valve stem.

4. In a high pressure grease gun, the combination of a lubricant reservoir, high pressure ejecting means supplied with lubricant from said container and having a discharge passageway and a by-pass between said passageway and said container, atmospheric vent means associated with said discharge passageway, said means comprising a pair of valves arranged for alternate closure of the vent opening, a check valve normally closing said by-pass, and a spring for holding said check valve in closed position, said spring being arranged to be placed under maximum tension when one of said valves is closed and to be placed under minimum tension when the other of said valves is closed.

5. In a portable manually operated high pressure grease gun, the combination of a lubricant container, high pressure ejecting means supplied with lubricant from said container, said ejecting means having a discharge passageway and a duct connecting said container with said discharge passageway, a check valve normally closing said duct, a spring for holding said check valve in closed position, and means operable from the exterior of said gun for varying the tension of said spring.

6. In a grease gun, the combination of a lubricant container, high pressure ejecting means connected to said container, said ejecting means having a discharge passageway and a duct connecting said container with said discharge passageway, a spring pressed check valve normally closing said duct against flow of lubricant from said pasageway to said container, and means for relieving the tension on said spring.

7. A portable manually operable high pressure grease gun comprising a high pressure piston and cylinder, a barrel for supplying lubricant to said high pressure cylinder and forming a handle therefor, and a pair of spaced annular radially extending flanges on said barrel.

8. In a high pressure grease gun, the combination of a lubricant container, high pressure ejecting means connected to said container to be supplied with lubricant therefrom, said ejecting means having a discharge outlet and a passageway connecting said outlet with said container, a check valve normally closing said passageway, a vent outlet, a valve stem threaded in said vent outlet, said stem having a pair of valves secured thereto for operation thereby to selectively control said vent outlet, and a spring positioned between said check valve and said valve stem to close said check valve, said spring being arranged to have its tension varied by movement of said valve stem.

9. In a high pressure grease gun, the combination of a lubricant reservoir, high pressure ejecting means supplied with lubricant from said container and having a discharge passageway and a by-pass between said passageway and said container, atmospheric vent means associated with said discharge passageway, said means comprising a valve member having valve parts thereof arranged for alternate closure of the vent opening, a check valve normally closing said by-pass, and a spring for holding said check valve in closed position, said spring being arranged to be compressed when one of said valves is closed.

GEORGE F. THOMAS.
JOSEPH BYSTRICKY.